United States Patent
Kulkarni et al.

(10) Patent No.: US 11,032,375 B2
(45) Date of Patent: Jun. 8, 2021

(54) AUTOMATIC SCALING FOR COMMUNICATIONS EVENT ACCESS THROUGH A STATEFUL INTERFACE

(71) Applicant: Inference Communications Pty. Ltd., Melbourne (AU)

(72) Inventors: Santosh Kulkarni, Glen Waverley (AU); Callan Schebella, Mill Valley, CA (US); Chandresh Viradia, Officer (AU)

(73) Assignee: INFERENCE COMMUNICATIONS PTY. LTD., Melbourne (AU)

( * ) Notice: Subject to any disclaimer, the term of this patent is extended or adjusted under 35 U.S.C. 154(b) by 302 days.

(21) Appl. No.: 15/729,563

(22) Filed: Oct. 10, 2017

(65) Prior Publication Data
US 2019/0109908 A1    Apr. 11, 2019

(51) Int. Cl.
| H04L 29/08 | (2006.01) |
| H04L 12/26 | (2006.01) |
| H04L 12/24 | (2006.01) |
| H04L 29/06 | (2006.01) |

(52) U.S. Cl.
CPC ........ *H04L 67/141* (2013.01); *H04L 41/0896* (2013.01); *H04L 43/0811* (2013.01); *H04L 67/1008* (2013.01); *H04L 67/142* (2013.01); *H04L 67/143* (2013.01); *H04L 67/02* (2013.01); *H04L 69/16* (2013.01)

(58) Field of Classification Search
CPC . H04L 67/141; H04L 67/1008; H04L 67/142; H04L 43/0811; H04L 41/0896; H04L 67/143; H04L 67/02; H04L 69/16
See application file for complete search history.

(56) References Cited

U.S. PATENT DOCUMENTS

| 10,025,718 | B1 * | 7/2018 | Wasiq | G06F 11/34 |
| 10,466,981 | B1 * | 11/2019 | MacMillan | G06F 9/48 |
| 2010/0131650 | A1 * | 5/2010 | Pok | H04L 41/0896 709/226 |
| 2011/0078318 | A1 * | 3/2011 | Desai | H04L 29/08171 709/228 |
| 2015/0319034 | A1 * | 11/2015 | Zourzouvillys | H04L 41/0668 370/228 |
| 2015/0326471 | A1 | 11/2015 | Anandan et al. | |
| 2017/0078408 | A1 | 3/2017 | Lepp et al. | |
| 2017/0171305 | A1 * | 6/2017 | Jones | H04L 47/828 |

* cited by examiner

*Primary Examiner* — Kim T Nguyen
(74) *Attorney, Agent, or Firm* — Brian R. Galvin; Galvin Patent Law LLC

(57) ABSTRACT

A system for automatic scaling for communications event access through a stateful interface is provided, comprising a channel manager configured to create a first connection to a first stateful interface event provider, determine a second stateful interface event provider based at least in part by the present load of the second stateful interface event provider, and create a second connection to the second stateful interface event provider; and a subscription manager configured to monitor the first and second connections for connection problems based at least in part by subscription access of the first and second connections.

9 Claims, 9 Drawing Sheets

AUTOMATIC SCALING FOR COMMUNICATIONS EVENT ACCESS THROUGH A STATEFUL INTERFACE

CROSS-REFERENCE TO RELATED APPLICATIONS

None.

BACKGROUND OF THE INVENTION

Field of the Invention

The disclosure relates to the field of unified communications systems, particularly to auto-scaling of a stateful interface.

Discussion of the State of the Art

Present day businesses may rely on a unified communications (UC) network that provides several functions that may be crucial to operating a business smoothly. One such network commonly used in the art is the BROADWORKS network from BROADSOFT, which operates through an interface known as XTENDED SERVICE INTERFACE (XSI). Users may subscribe to event packages, for example, a basic call package, an advanced call package, or the like; and the server may send all the events relevant to a particular package to a user defined uniform resource locator (URL). Users may access these events through one of two methods: HTTP, or channel. The HTTP method uses a standard representational state transfer (REST) interface that sends events in an asynchronous manner, and does not require a persistent connection. The HTTP method may be easily scaled with standard web scaling methods.

On the other hand, the channel method utilizes what is known in the art as a "stateful" interface, which relies on opening and maintaining a persistent connection to the server. The connection in this case is a single TCP connection, which relays events to the user. The problem arises when a large number of subscriptions are received on a server. The server may get overloaded, and it may be desirable to add more servers. However, due to the use of a singular connection and stateful interface, automatic scaling of this architecture may prove difficult. Any server scaling may require manual configuration or requiring users to reconnect. This may result in downtime, and, consequently, events may be lost before a new connection can be established.

What is needed is a system in which the infrastructure is automatically scalable, regardless of which method is being used to access events, whether using a REST or stateful interface. Such a system would, additionally, provide a user-friendly interface for a user to create event filters of varying complexity without scripting or programming experience.

SUMMARY OF THE INVENTION

Accordingly, the inventor has conceived, and reduced to practice, a system and method for automatic scaling for communications event access through a stateful interface.

In a preferred embodiment, redundant connections are provided by a channel manager. The channel manager may monitor the system for connection problems, and determine whether adjustments in server configurations are needed. And due to the redundant connections, the channel manager may distribute user connections as it sees fit without concern of loss of events to any particular user.

According to one embodiment of the present invention a system for automatic scaling for communications event access through a stateful interface is provided, comprising a channel manager comprising a memory, a processor, and a plurality of programming instructions stored in the memory thereof and operable on the processor thereof, wherein the programmable instructions, when operating on the processor, cause the processor to create a first connection to a first stateful interface event provider, determine a second stateful interface event provider based at least in part by the present load of the second stateful interface event provider, and create a second connection to the second stateful interface event provider; and a subscription manager comprising a memory, a processor, and a plurality of programming instructions stored in the memory thereof and operable on the processor thereof, wherein the programmable instructions, when operating on the processor, cause the processor to monitor the first and second connections for connection problems based at least in part by subscription access of the first and second connections.

According to another embodiment, the channel manager disconnects from the primary connection when connection problems are detected on the primary connection, while keeping the backup connection active until the primary connection is re-established. According to another embodiment, the channel manager creates a new instance of a stateful interface event for the primary connection. According to another embodiment, the channel manager terminates a server instance when it is determined to be underutilized. According to another embodiment, the channel manager reconfigures at least memory throughput of a pre-existing stateful interface event provider. According to another embodiment, the channel manager reconfigures at least bandwidth allocation of a pre-existing stateful interface event provider. According to another embodiment, the system further comprises a web frontend that provides a graphical user-interface for a user to create rules-based filters that react to a communications event. According to another embodiment, the web frontend provides a graphical user-interface for a user to filter or react to communications events in real-time.

According to another aspect of the invention, a method for automatic scaling for communications event access through a stateful interface is provided, comprising the steps of (a) creating a first connection to a first stateful interface event provider with a channel manager; (b) determining a second stateful interface event provider based at least in part by the present load of the second stateful interface event provider with the channel manager; (c) creating a second connection to the second stateful interface event provider with the channel manager; (d) monitoring the first and second connections for connection problems based at least in part by subscription access of the first and second connections with a subscription manager; (e) routing events through the backup connection when a connection has been detected on the primary connection; (f) finding a new event provider to reestablish the primary connection; (g) reestablishing the primary connection to the new event provider; and (h) rerouting events through the primary connection.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
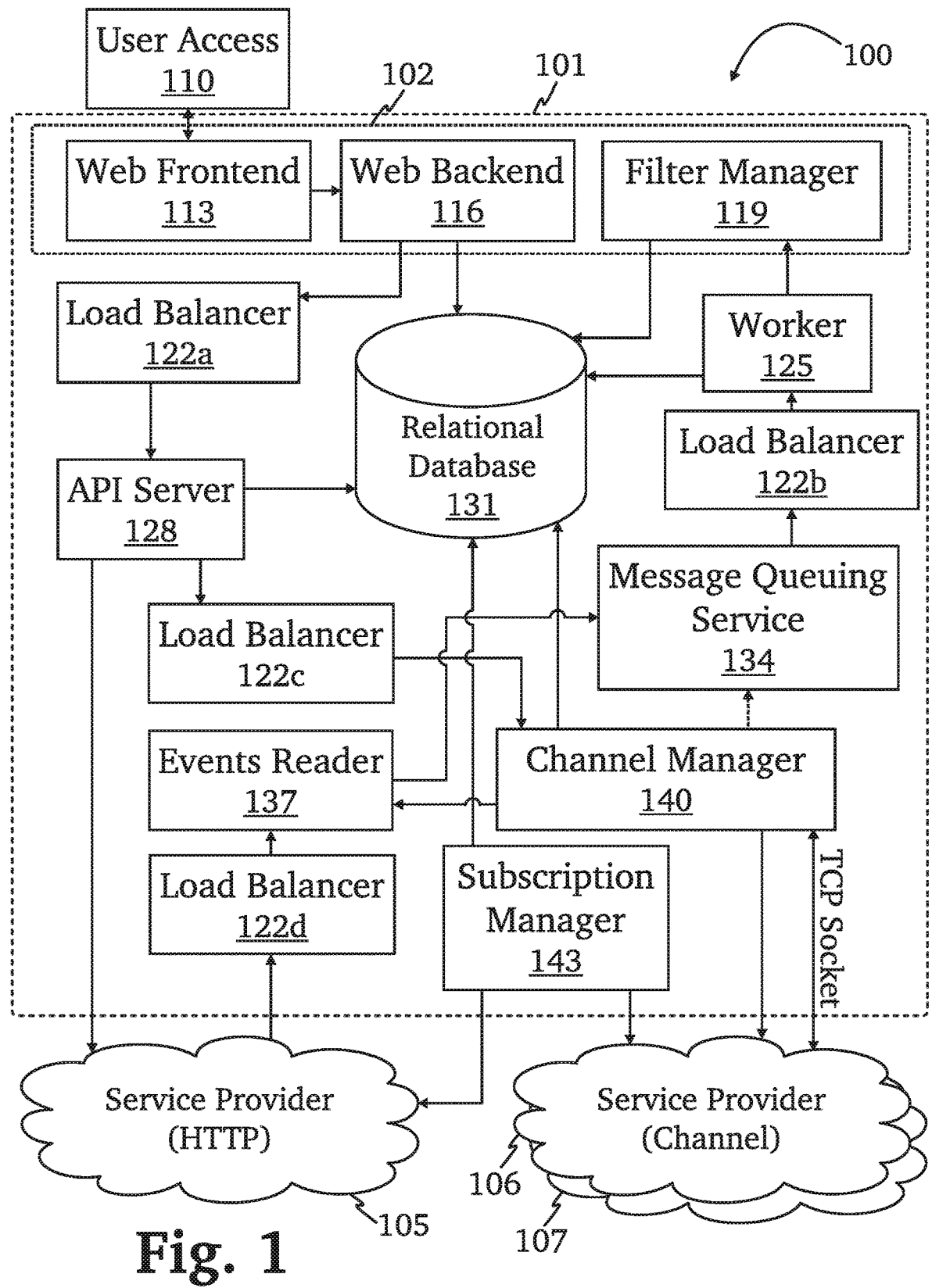
FIG. 1 is a block diagram of an exemplary system architecture of a communications operating system according to various embodiments of the invention.

The inventor has conceived, and reduced to practice, a system and method for automatic scaling for communications event access through a stateful interface.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram of an exemplary system architecture 100 of a communications operating system 101 according to various embodiments of the invention. Communications operating system 101 comprises a user-accessible portal 102, a plurality of load balancers 122[*a-d*], a worker 125, an application programming interface (API) server 128, a relational database 131, a message queue 134, an events reader 137, a channel manager 140, and a subscription manager 143. System 100 may also include external service providers: an HTTP-method service provider 105, a primary channel-method service provider 106, and a secondary channel-method service provider 107. Primary channel-method service provider 106 may be configured to operate on multiple instances, or run on an easily-scalable architecture; while secondary channel-method service provider 107, used mainly as a fail-safe channel to prevent loss of events in case of primary connection failure and, therefore, may be a manually-scaled and manually configured server. Since secondary channel-method service provider 107 is used mainly as a fail-safe, the expected traffic and load through secondary channel-method service provider 107 may be easily handled with less resources. In a preferred embodiment, since the primary service provider and secondary servicer provider are designed as a redundant connection, they may run on separate processes in to order to prevent dependency on a common resource.

User access 110 is provided via portal 102, which may comprise a web frontend 113, a web backend 116, and a filter manager 119. Web frontend 113 may provide a user-friendly visual interface to portal 102 where a user may create and manage rule-based filters based on communications-based events. The filters may be tied to reactions or a chain of reactions such as, but is not limited to, sending email, forward call to voice, or triggering a web service. Rules may be based on such metrics as call duration, wait times, a particular caller, or the like. The filters and their reactions may be managed by filter manager 119. In addition to providing a graphical interface for creating filters, web frontend 113 may also provide a graphical user-interface to filter and react to events in real-time on an event-by-event basis, without the need to create a rule for a particular event. For example, a user has received a call from a source that was not accounted for in any pre-created rules. Using the interface, the user may react to the call, such as sending an email or sending the call to a voicemail inbox, as the call is occurring. An API server 128 may provide a user-friendly API for external applications to facilitate event subscriptions, nominate events of interest, check subscription status, receive event requests, and the like. Channel Manager 140 may manage the connections with channel-method service providers, and ensures a persistent connection is maintained through a primary TCP connection and secondary TCP connection within a channel set. Channel Manager 140 may also increase or decrease service provisions as needed, based on user demand. For example, if channel manager 140 encounters problems with connecting a user to a primary service provider, the channel manager may add more primary service connections by dynamically starting a new instance of a service provider for the user to connect. If, on the other hand, channel manager 140, detects the presence of instances with little or no connections, the channel manager may reconnect the few connections to a more populated instance before terminating the unpopulated instances. Due to the redundant secondary connection, no loss of event occurs during the momentary reconnection period.

Events reader 137 may process events received from HTTP-method service provider 105, and channel manager 140 before sending them to message queue service 134. Worker 125 may process events received from message queue service 134. The events may be filtered based on user-defined rules, stored in relational database 131, and sent to remote applications. Subscription manager 143 may manage subscriptions by monitoring all subscriptions, and, if required, may also renew them. Working in tandem with channel manager 140, subscription manager 143 may also monitor subscriptions to detect the loss of any connections. If a disconnection is detected, a new connection may be established, which may be to a pre-existing instance or server, or it may be to a newly created instance, such as, in cases in which automatic scaling has occurred.

It will be appreciated by one skilled in that art that system 100 may be configured to run entirely, or partially on public cloud resources. For example, web frontend 113, web backend 116, filter manager 119, worker 125, (API) server 128, events reader 137, channel manager 140, and subscription manager 143 may use a resizable public cloud resource, such as AMAZON'S ELASTIC CLOUD COMPUTE (EC2); message queue service 134 may use a message queuing service such as AMAZON'S SIMPLE QUEUE SERVICE (SQS); and relational database 131 may use a cloud database service such as AMAZON'S RELATIONAL DATABASE SERVICE (RDS). Additionally, load balancers 122[a-d] are illustrated in FIG. 1 to provide an example. Other embodiments may have more or less load balancers in use, and there may be load balancers used in places that are not shown in the illustrated example. For simplicity, load balancers 122 [a-d] may not be used in discussion below, but it should be appreciated that load balancers are implicitly in use.

Detailed Description of Exemplary Aspects

Figure 2:
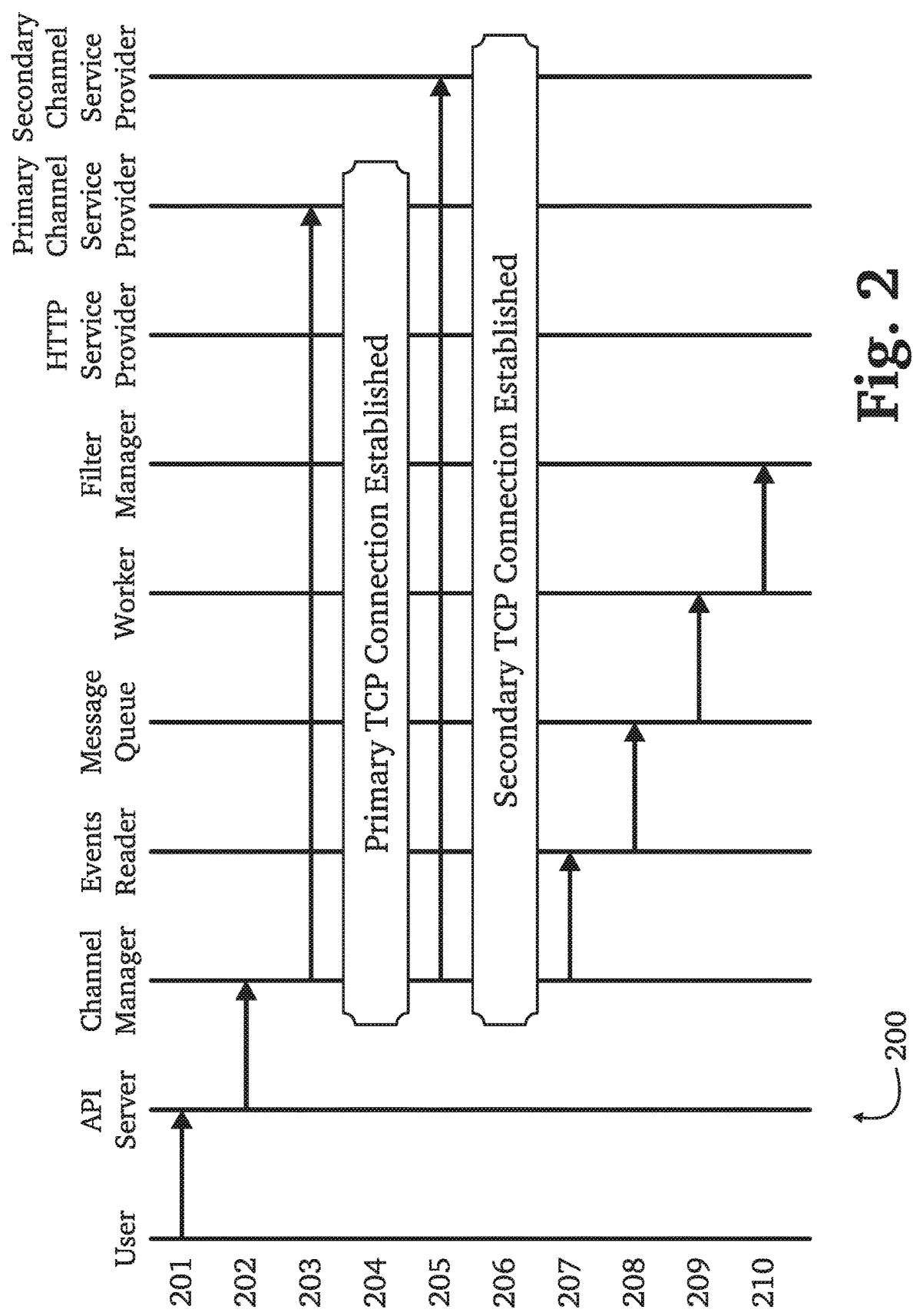
FIG. 2 is an exemplary sequence chart for accessing events via channel-method according to the system of FIG. 1.

FIG. 2 is an exemplary sequence chart 200 for accessing events via channel-method according to the system of FIG. 1. At row 201, a user may initiate an event request. This may be through an external application, or through the system portal, which sends commands and/or event requests to API server 128. At row 202, since the user in this example is making a channel-method request, the channel manager is engaged. At rows 203-204, the channel manager establishes a primary service connection, which creates a primary TCP socket connection. At rows 205-206, a redundant secondary service connection is established, which creates a secondary TCP socket connection. At this point, events are sent, primarily through the primary connection, back to the channel manager. As discussed above, the secondary connection is used primarily as a fail-safe channel that may be used in the event that the primary connection is lost. At row 207, events from the channel manager are sent to the events reader. At row 208, received events are sent to the message queue. At row 209, the worker receives events from the message queue, and applies user-defined filters to the events. At row 210, the set of filtered events are sent to the filter manager, where user-defined reactions may be executed.

For the sequence of chart 200, it should be understood that after the TCP socket connections are established in rows 204 and 206, rows 207-210 may run on a continuous loop until the user terminates the TCP connections.

Figure 3:
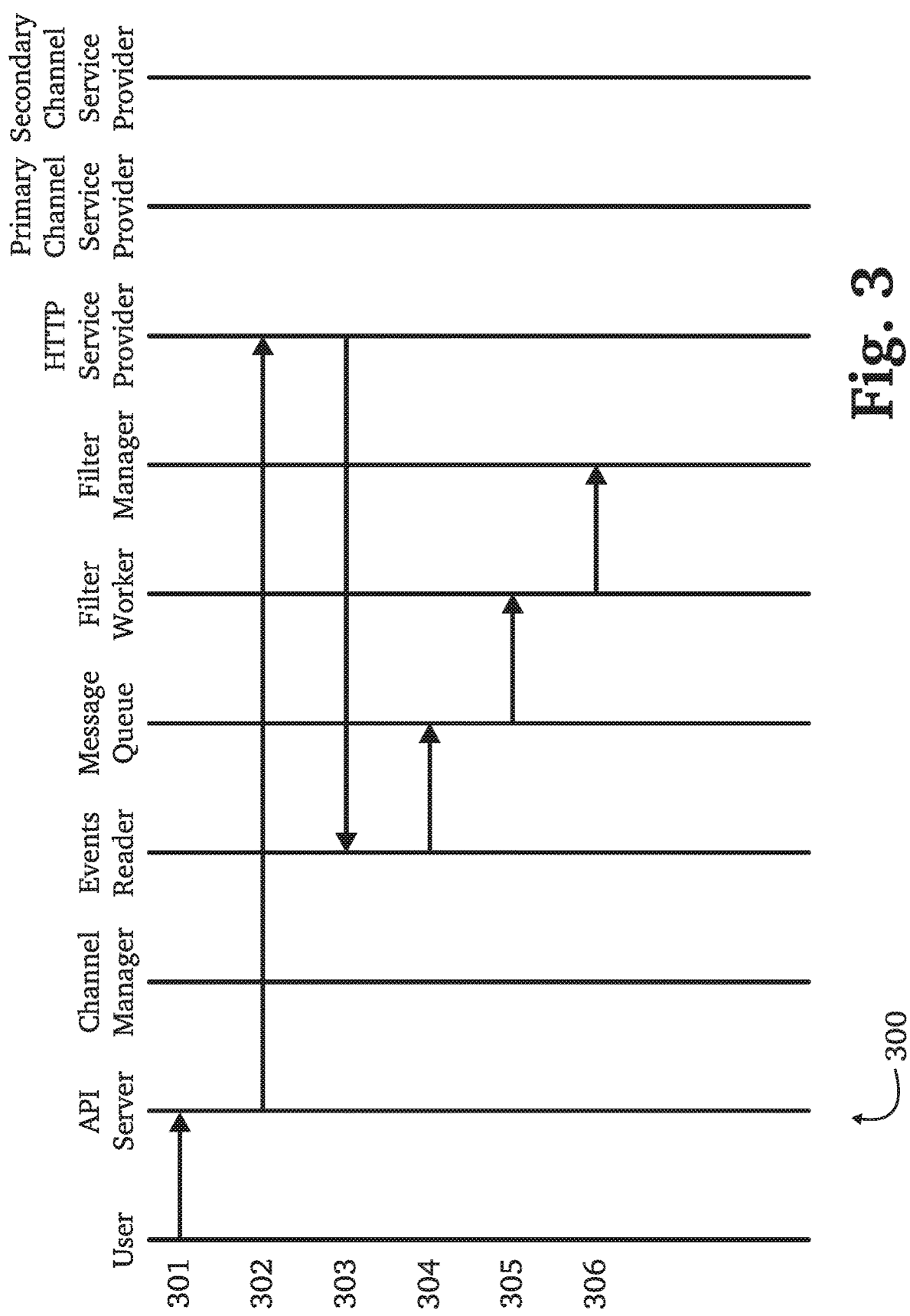
FIG. 3 is an exemplary sequence chart for accessing events via HTTP-method according to the system of FIG. 1.

FIG. 3 is an exemplary sequence chart 300 for accessing events via HTTP method according to the system of FIG. 1. At row 301, a user may initiate an event request. This may be through an external application, or through the system portal, which sends commands and/or event requests to API server 128. At row 302, since the user in this example is making a HTTP-method request, the user is connected to the HTTP-method service provider. The user may interact with the service provider through a REST interface in an asynchronous manner. At row 303, events from the service provider are sent to the events reader. At row 304, received events are sent to the message queue. At row 305 the worker receives events from the message queue, and applies user-defined filters to the events. At row 306, the set of filtered events are sent to the filter manager, where user-defined reactions may be executed.

As evident by chart 300, connection to an HTTP-method service provider may comprise fewer steps. Also, since a persistent connection is not required for event processing, the server may be scaled, through traditional web scaling methods, without any loss of events, unlike the channel-method connection.

Figure 4:
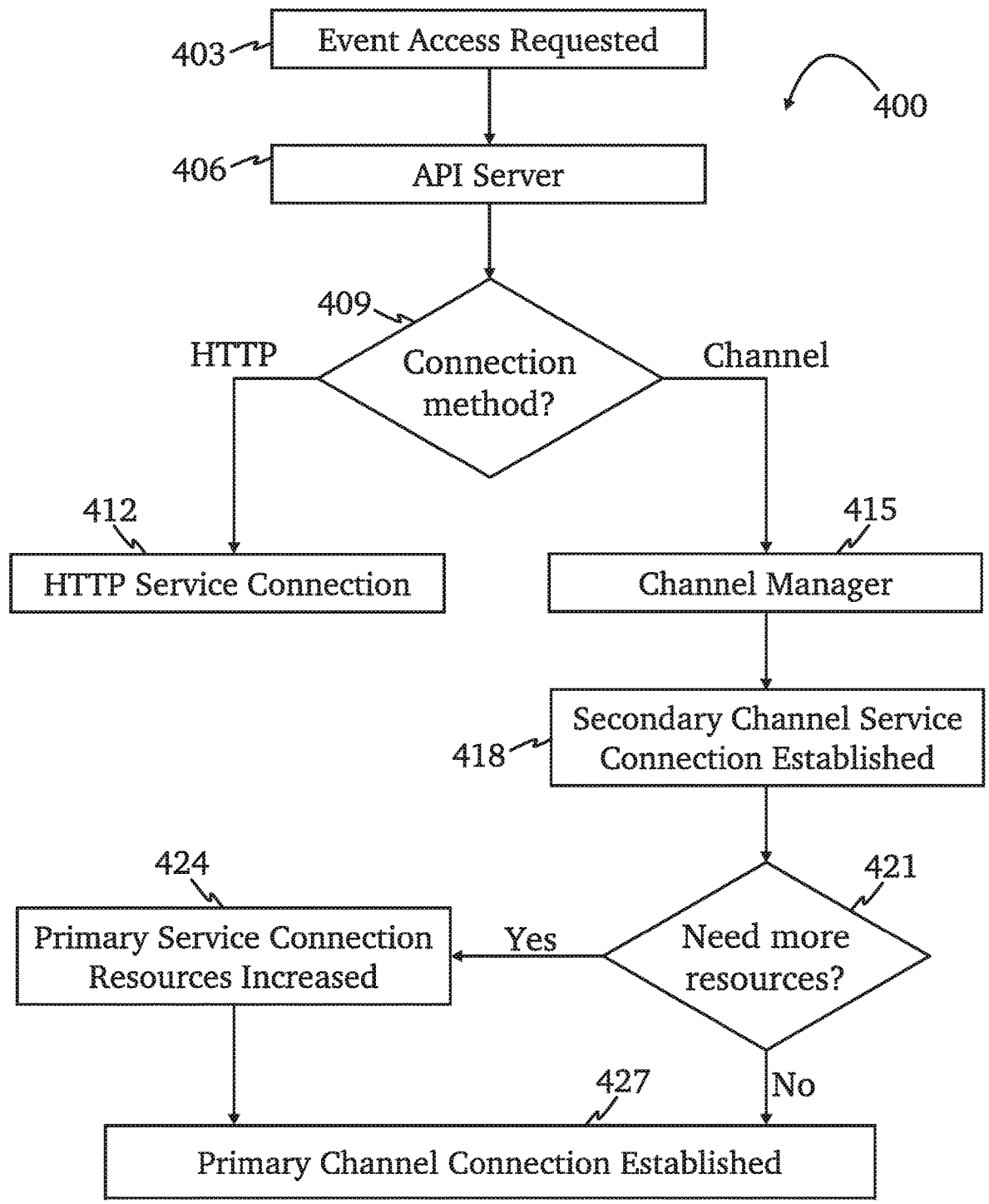
FIG. 4 is a flowchart of an exemplary method for accessing events using a plurality of possible connection methods according to various embodiments of the invention.

FIG. 4 is a flowchart of an exemplary method 400 for accessing events using a plurality of possible connection methods according to various embodiments of the invention. At an initial step, 403, a user may request access to events. As discussed above, this may be through a web-based frontend or an external application utilizing an API to provide user access, which occurs at step 406. At step 409, depending on device or application used, the user may access events either through the HTTP-method or channel-method. If the connection is via HTTP, step 412 is reached, and an HTTP service connection is established. The user may interact with the service provider with a REST API.

On the other hand, if the required connection is through a channel, the user is engaged with a channel manager at step 415. At step 418, the channel manager connects the user to a secondary channel-method service provider. As discussed above, the secondary channel is primarily used as a fail-safe channel to prevent loss of events due to unforeseen disconnection from a primary channel, and also serves as a temporary placeholder connection before a primary connection can be established. At step 421, if the channel manager is having trouble connecting the user to a primary channel-method service provider, primary channel-method service provisions are increased at step 424. This may be accomplished through, for example, allocating more bandwidth, more memory, or starting up new instances of channel-method providers. At step 427, a primary channel-method connection is established. However, if at step 421, if the channel manager has no problems with connecting the user, the user is connected through the primary channel-method connection at step 421 without any increase to service provider provisions.

Figure 5:
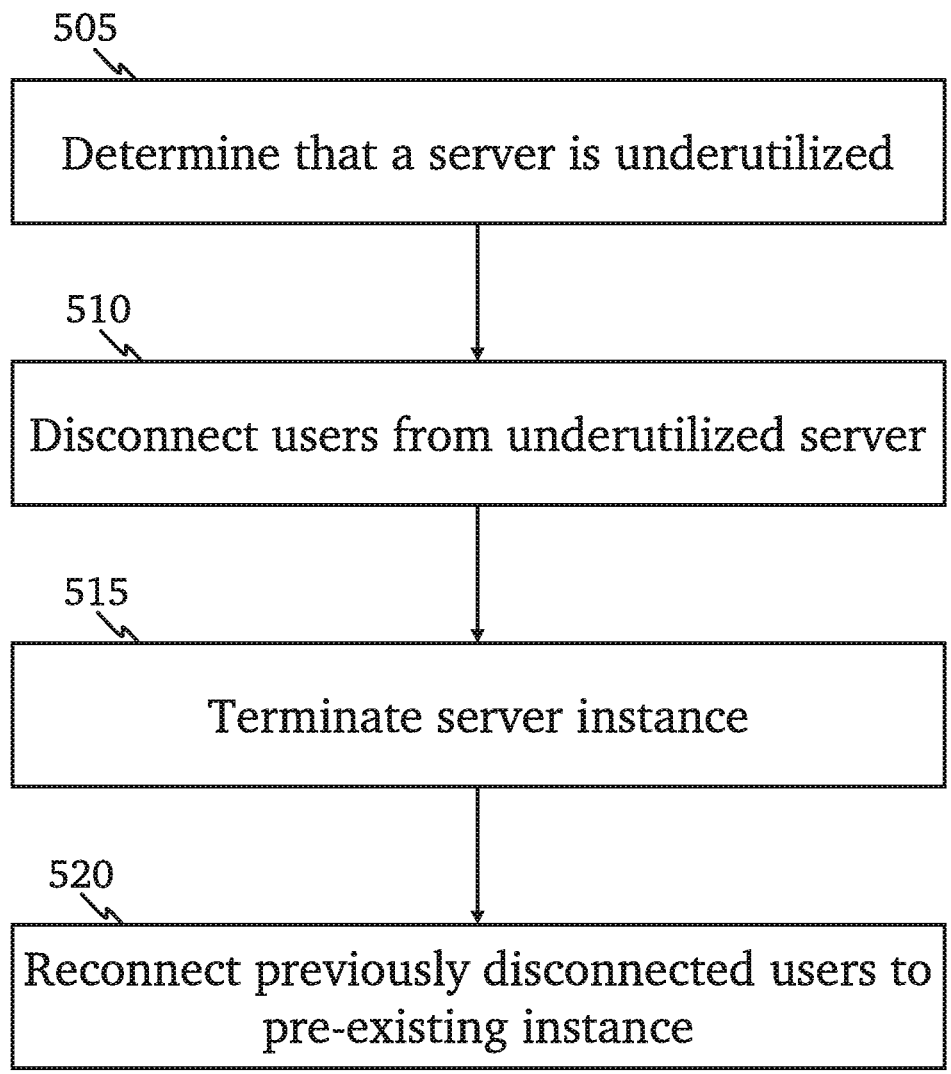
FIG. 5 is a flowchart of an exemplary method for decreasing channel-method server resources according to various embodiments of the invention.

FIG. 5 is a flowchart of an exemplary method 500 for decreasing channel-method server resources according to various embodiments of the invention. At an initial step 505, a channel-method service provider has been determined to be underutilized through system monitors, such as with the channel manager, or the subscription manager. For instance, it may outside of peak operating hours of a business, and the majority of users have disconnected from the server. At step 510, users presently connected to the underutilized server are disconnected. However, due to the redundant secondary connection, as discussed above, disconnected users are automatically switched to the secondary connection to prevent a lapse in event processing. At step 515, the server process, which now has no connected users, may be automatically terminated by the channel manager. At step 520, users that were previously disconnected are reconnected to a pre-existing server to recommence event processing.

In some embodiments, instead of terminating a server instance, the server may undergo automatic reconfiguration. This may include, but is not limited to, decreasing memory, decrease bandwidth, reducing computation power, or the like.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 6:
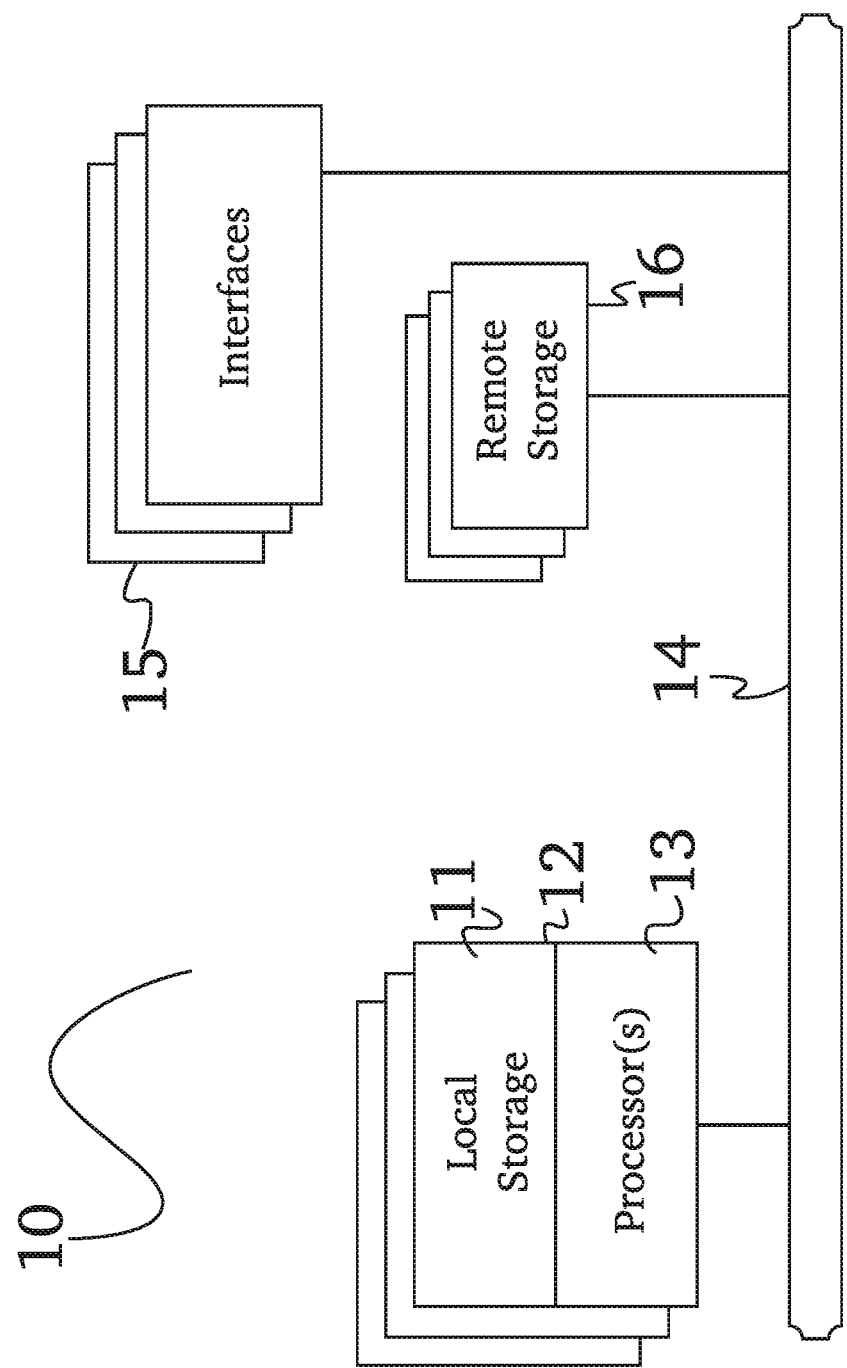
FIG. 6 is a block diagram illustrating an exemplary hardware architecture of a computing device used in various embodiments of the invention.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 6 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 7:
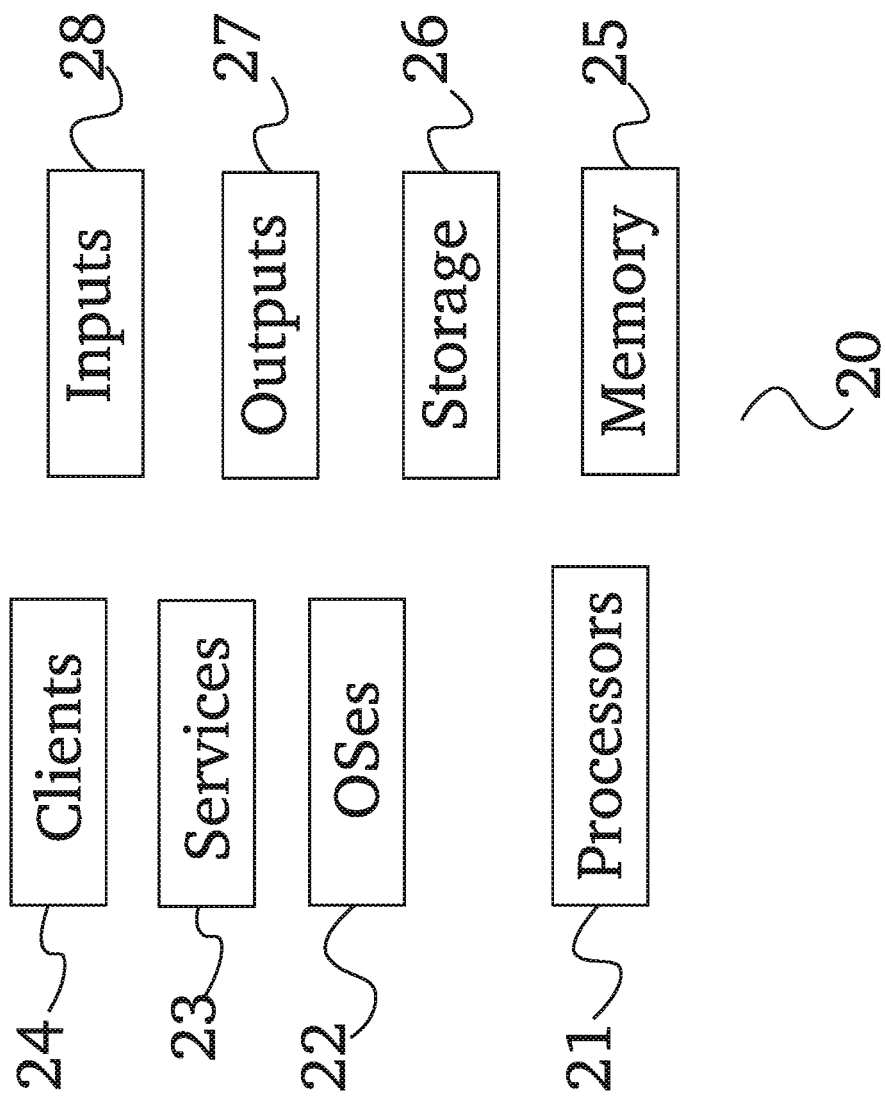
FIG. 7 is a block diagram illustrating an exemplary logical architecture for a client device, according to various embodiments of the invention.

In some aspects, systems may be implemented on a standalone computing system. Referring now to FIG. 7, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 6). Examples of storage devices 26 include flash memory, magnetic hard drive, CD-ROM, and/or the like.

Figure 8:
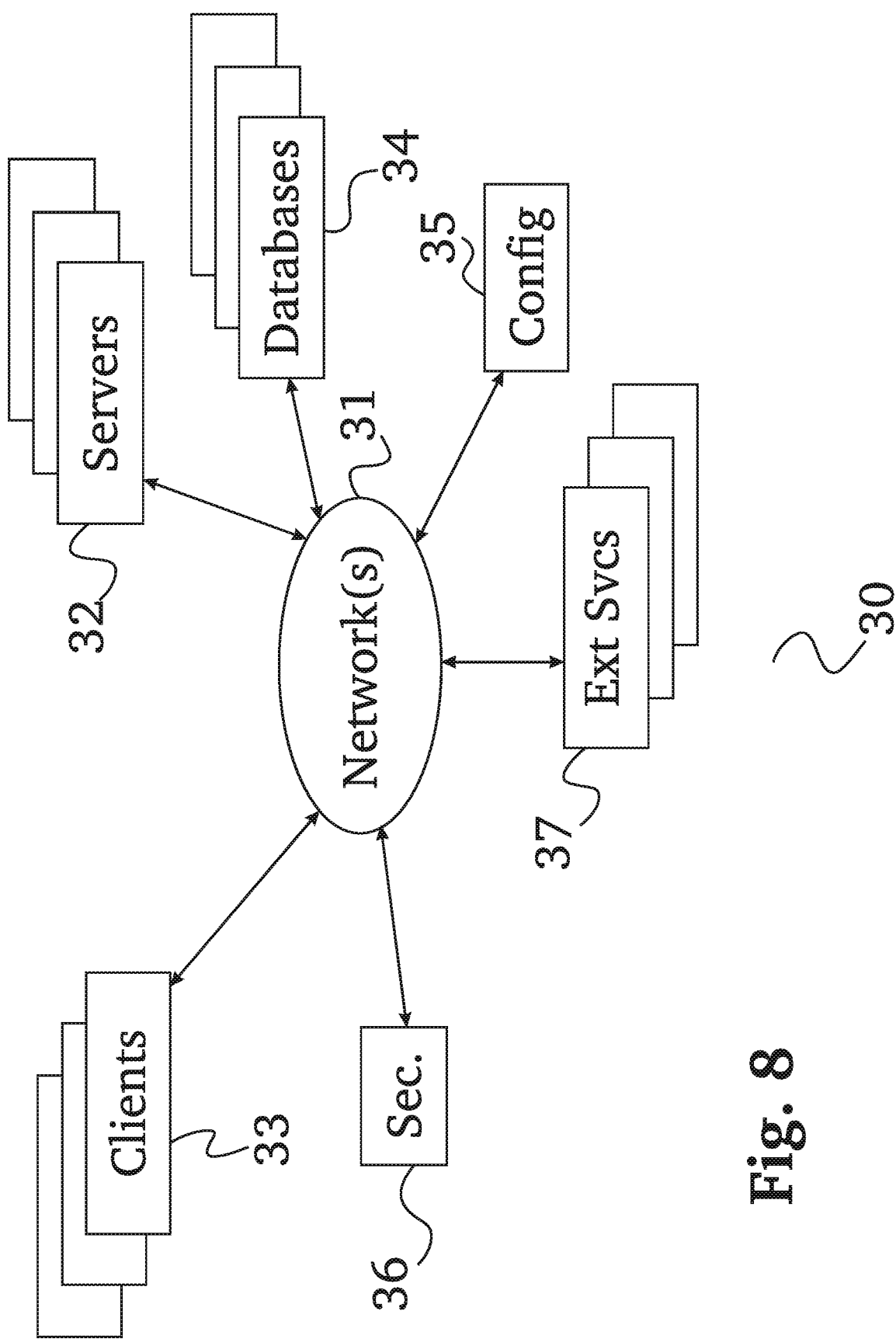
FIG. 8 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 8, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 7. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as Wi-Fi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 9:
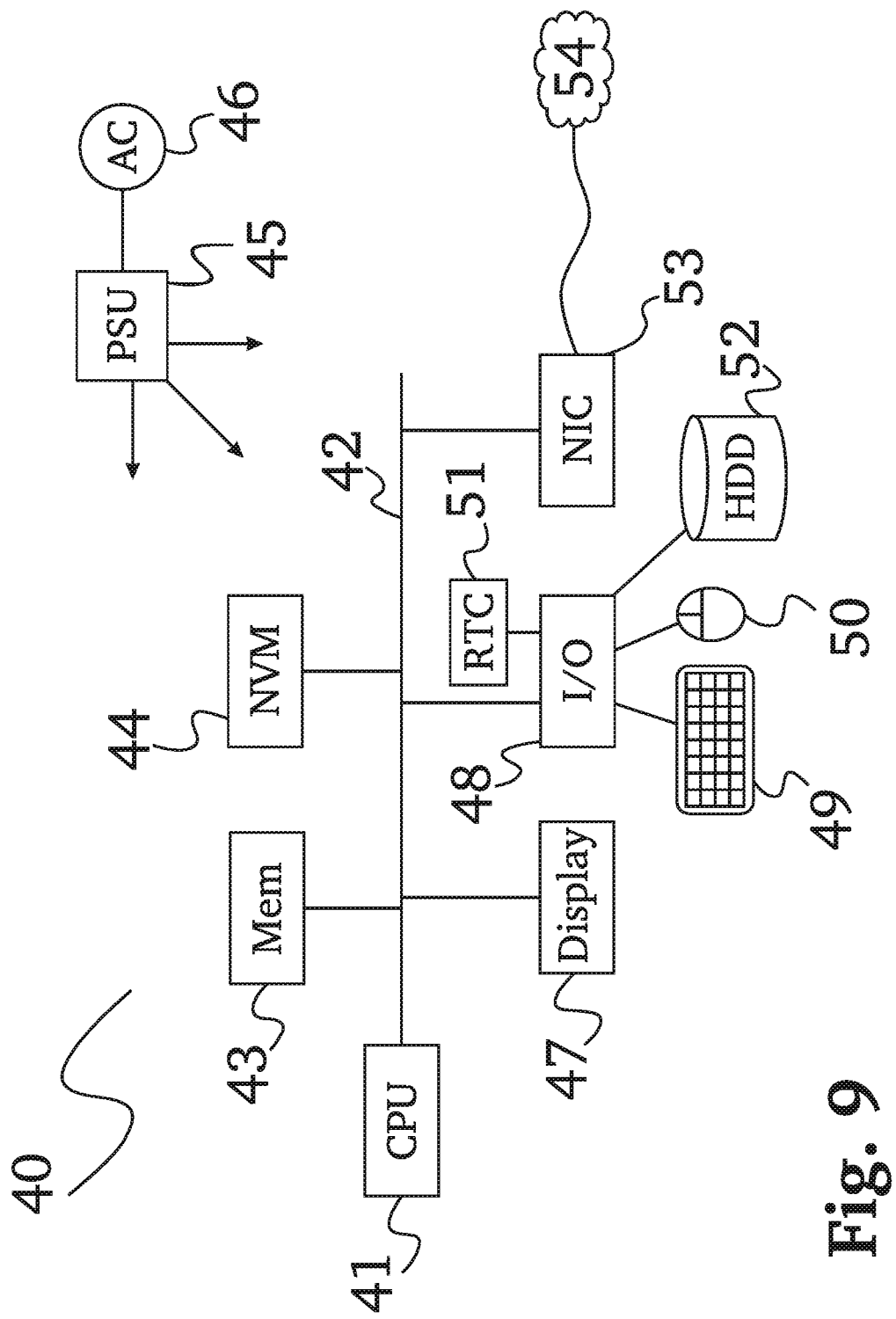
FIG. 9 is another block diagram illustrating an exemplary hardware architecture of a computing device used in various embodiments of the invention.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for automatic scaling for communications event access through a stateful interface, comprising:
   a channel manager comprising a memory, a processor, and a plurality of programming instructions stored in the memory thereof and operable on the processor thereof, wherein the programmable instructions, when operating on the processor, cause the processor to:
      create a backup connection to a first stateful interface event provider;
      determine a plurality of second stateful interface event providers to which to establish a connection, the determination being based at least in part by a present load of each of the second stateful interface event providers;
      create a primary connection to each of the second stateful interface event providers determined to have a present load within acceptable parameters;
      process a plurality of user-generated events using each of the primary connections while monitoring user demand to each of the primary connections, the user demand for a particular primary connection being based on the quantity of user events being processed through the particular primary connection and the present load of the respective second stateful interface event provider to which the particular primary connection is connected;
      when user demand is above a first predetermined threshold, determine an additional stateful interface event provider to which to establish an additional primary connection, the determination being based at least in part on a present load of the additional stateful interface event provider;
      create an additional primary connection to the additional stateful interface event provider;
      when user demand is below a second predetermined threshold for a primary connection, disconnect the respective connection; and
   a subscription manager comprising a memory, a processor, and a plurality of programming instructions stored in the memory thereof and operable on the processor thereof, wherein the programmable instructions, when operating on the processor, cause the processor to:
      monitor the primary and backup connections for connection problems based at least in part by subscription access of the primary and backup connections.

2. The system of claim 1, wherein the channel manager disconnects from the primary connection when a connection problem is detected on the primary connection, while keeping the backup connection active until the primary connection is re-established.

3. The system of claim 1, wherein the channel manager creates a new instance of a stateful interface event for the primary connection.

4. The system of claim 1, wherein the channel manager terminates a server instance when it is determined to be underutilized.

5. The system of claim 1, wherein the channel manager reconfigures at least memory throughput of a pre-existing stateful interface event provider.

6. The system of claim 1, wherein the channel manager reconfigures at least bandwidth allocation of a pre-existing stateful interface event provider.

7. The system of claim 1, further comprising a web frontend that provides a graphical user-interface enabling a user to create rules-based filters that define a plurality of reactions to communications events.

8. The system of claim 7, wherein the web frontend provides a graphical user-interface for the user to filter or react to communications events in real-time.

9. A method for automatic scaling for communications event access through a stateful interface, comprising the steps of:
   (a) creating a backup connection to a first stateful interface event provider with a channel manager;
   (b) determining a second stateful interface event provider to which to establish a connection, the determination being based at least in part by a present load of the second stateful interface event provider with the channel manager;
   (c) creating a plurality of primary connections to each of the second stateful interface event providers determined to have a present load within acceptable parameters, with the channel manager;
   (d) processing a plurality of user-generated events using each of the primary connections while monitoring user demand to each of the primary connections using the channel manager, the user demand for a particular primary connection being based on the quantity of user events being processed through the particular primary connection and the present load of the respective second stateful interface event provider to which the particular primary connection is connected;
   (e) when user demand is above a first predetermined threshold, determining an additional stateful interface event provider to which to establish an additional primary connection using the connection manager, the determination being based at least in part on a present load of the additional stateful interface event provider;
   (f) creating an additional primary connection to the additional stateful interface event provider, using the connection manager;
   (g) when user demand is below a second predetermined threshold for a primary connection, disconnecting the respective connection using the connection manager;
   (h) monitoring the backup and primary connections for connection problems based at least in part by subscription access of the backup and primary connections with a subscription manager;
   (i) routing events through the backup connection when a connection has been detected on the primary connection;
   (j) finding a new event provider to reestablish the primary connection;
   (k) reestablishing the primary connection to the new event provider; and
   (l) rerouting the events through the primary connection.

* * * * *